United States Patent
Proefke et al.

(10) Patent No.: US 10,147,253 B1
(45) Date of Patent: Dec. 4, 2018

(54) SYSTEMS AMD METHODS FOR ACCESSING A VEHICLE USING A SINGLE, EXTERIOR CONTROL

(71) Applicant: GM GLOBAL TECHNOLOGY OPERATIONS LLC, Detroit, MI (US)

(72) Inventors: David T. Proefke, Troy, MI (US); Thomas E. Utter, Royal Oak, MI (US); Akhil N. Neti, Novi, MI (US); Luis David Gonzalez Valdez, Berkley, MI (US); Rohit Uttam, Clinton Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 8 days.

(21) Appl. No.: 15/679,389

(22) Filed: Aug. 17, 2017

(51) Int. Cl.
*G07C 9/00* (2006.01)
*B60R 25/24* (2013.01)

(52) U.S. Cl.
CPC ........ *G07C 9/00309* (2013.01); *B60R 25/243* (2013.01); *G07C 9/00698* (2013.01); *G07C 2009/00341* (2013.01); *G07C 2009/00515* (2013.01); *G07C 2009/00547* (2013.01)

(58) Field of Classification Search
CPC ....... G07C 9/00309; B60R 25/24; B60R 1/12; B60R 2001/1284; B60R 25/01; B60W 50/08

USPC .......................................... 340/5.7, 5.72, 5.8
See application file for complete search history.

(56) References Cited

U.S. PATENT DOCUMENTS

| | | | |
|---|---|---|---|
| 2005/0190040 A1* | 9/2005 | Huntzicker | ............... B60R 1/12 340/5.54 |
| 2016/0340940 A1* | 11/2016 | Krishnan | ................ E05B 81/86 |
| 2017/0349142 A1* | 12/2017 | Krishnan | ........... G07C 9/00182 |

* cited by examiner

*Primary Examiner* — Yong Hang Jiang
(74) *Attorney, Agent, or Firm* — Lorenz & Kopf, LLP

(57) ABSTRACT

An access system for a vehicle includes a first vehicle subsystem configured to control access to an interior compartment of the vehicle, an actuator mounted on the vehicle and movable between first and second positions, and a controller coupled to the actuator and configured to: detect a first actuation sequence of the actuator, the first actuation sequence corresponding to an access code; during the first actuation sequence of the actuator, provide an audible, visual, or tactile response from the vehicle, by causing activation of a vehicle system; compare the access code to an authorization code; and generate a first control signal configured to cause the first vehicle subsystem to switch between a first state and a second state when the access code corresponds to the authorization code.

16 Claims, 2 Drawing Sheets

SYSTEMS AMD METHODS FOR ACCESSING A VEHICLE USING A SINGLE, EXTERIOR CONTROL

INTRODUCTION

The present disclosure generally relates to vehicle systems and operations. More particularly, the present disclosure relates to systems and methodologies for accessing a vehicle.

Many modern vehicles include passive entry passive start (PEPS) systems that enable an individual to gain entry to the vehicle and/or start the vehicle without directly interacting with a vehicle key. These PEPS systems rely on the use of key fobs, smartphones and other mobile communications devices that transmit wireless signals to a wireless communication module in the vehicle. On some occasions, the mobile communications devices used to request entry to the vehicle are unavailable or inoperable.

Accordingly, it is desirable to provide systems and methodologies to enable a vehicle user to enter a vehicle when PEPS components such as a key fob or mobile communications device are unavailable or fail to operate. Furthermore, other desirable features and characteristics of the present disclosure will become apparent from the subsequent detailed description and the appended claims, taken in conjunction with the accompanying drawings and this introductory section.

BRIEF SUMMARY

In one exemplary embodiment, an access system for a vehicle includes a first vehicle subsystem configured to control access to an interior compartment of the vehicle, an actuator mounted on the vehicle and movable between first and second positions, and a controller coupled to the actuator and configured to: detect a first actuation sequence of the actuator, the first actuation sequence corresponding to an access code; during the first actuation sequence of the actuator, provide an audible, visual, or tactile response from the vehicle, by causing activation of a vehicle system that is optionally selected from one or more of an interior chime, a horn, a door lock motor, a mirror motor, a turn indicator, an alarm status indicator, a parking lamp, and a dome lamp; compare the access code to an authorization code; and generate a first control signal configured to cause the first vehicle subsystem to switch between a first state and a second state when the access code corresponds to the authorization code.

In one variation of this embodiment, the access system further includes a display system that is positioned inside of the vehicle but visible from outside of the vehicle, wherein the display system displays at least a portion of the access code during the first actuation sequence. The display system displays an access code placeholder and an access code digit value. The display system obscures entered digits of the access code prior to the placeholder. In another variation of this embodiment, the access system is electronically coupled with an in-vehicle communication network. The in-vehicle communication network is configured to receive the authorization code via a wireless electronic signal. The wireless electronic signal originates from a virtual reservation system. Or, the wireless electronic signal originates from an electronic application associated with a passive entry passive start (PEPS) system of the vehicle. In a further variation of this embodiment, the actuator is positioned on a door handle of the vehicle. Or, the actuator is positioned on an exterior rear closure control of the vehicle. In yet another variation of this embodiment, the first vehicle subsystem is a door lock subsystem, the first state is a locked vehicle state, and the second state is an unlocked vehicle state. Or, the first vehicle subsystem is an electrical subsystem for a device charging port, the first state is electrical energy not being supplied to the device charging port, and the second state is electrical energy being supplied to the device charging port.

In another exemplary embodiment, a method for accessing a vehicle includes, using an actuator mounted on the vehicle and movable between first and second positions, detecting a first actuation sequence of the actuator, the first actuation sequence corresponding to an access code; using a controller, during the first actuation sequence of the actuator, providing an audible, visual, or tactile response from the vehicle, by causing activation of a vehicle system that is optionally selected from one or more of an interior chime, a horn, a door lock motor, a mirror motor, a turn indicator, an alarm status indicator, a parking lamp, and a dome lamp; using the controller, comparing the access code to an authorization code; and using a first vehicle subsystem configured to control access to an interior compartment of the vehicle, generating a first control signal configured to cause the first vehicle subsystem to switch between a first state and a second state when the access code corresponds to the authorization code.

In one variation of this embodiment, the method further includes using a display system that is positioned inside of the vehicle but visible from outside of the vehicle, wherein the display system displays at least a portion of the access code during the first actuation sequence. The display system displays an access code placeholder and an access code digit value. The display system obscures entered digits of the access code prior to the placeholder. In another variation of this embodiment, the method includes using an electronically-coupled, in-vehicle communication network. The in-vehicle communication network is configured to receive the authorization code via a wireless electronic signal. The wireless electronic signal originates from a virtual reservation system. Or, the wireless electronic signal originates from an electronic application associated with a passive entry passive start (PEPS) system of the vehicle. In a further variation of this embodiment, the method includes providing an actuator that is positioned on a door handle of the vehicle. Or, the actuator is positioned on an exterior rear closure control of the vehicle. In yet another variation of this embodiment, the method uses a door lock subsystem, wherein the first state is a locked vehicle state, and the second state is an unlocked vehicle state. Or, the first vehicle subsystem is an electrical subsystem for a device charging port, the first state is electrical energy not being supplied to the device charging port, and the second state is electrical energy being supplied to the device charging port. In a further variation, the method may include gaining access to the vehicle or charging an electronic device within the vehicle.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the disclosed vehicle access systems and methods. Furthermore, there is no intention to be bound by any theory presented in the preceding introductory section or the following detailed description.

The vehicle access system described below can be used when mobile communications devices used with PEPS components are unavailable or inoperable. The system allows a user to use a control on the vehicle such as a door handle switch or an exterior rear closure switch to communicate an access code to a controller that compares the access code to a stored authorization code and, when the codes correspond, generates a control signal to a vehicle subsystem that includes a door lock and USB charging port to enable entry to the vehicle and use of the vehicle to charge a device. Initially, the authorization code may be provided to the vehicle using a vehicle reservation system or a remote link application. During the vehicle access (code entry) process, the vehicle's driver information center may be used to assist in code entry by indicating the place of the current digit being entered and the value of the current digit being entered. The vehicle may provide audible, visual, or tactile feedback to the user during the vehicle access (code entry) process, using for example an interior chime, door lock motor, turn indicator, alarm status indicator, or dome lamp. The vehicle access system may be integrated with other vehicle systems, such as the vehicle's embedded controller or an accessory device connected to an in-vehicle communication network.

Figure 1:
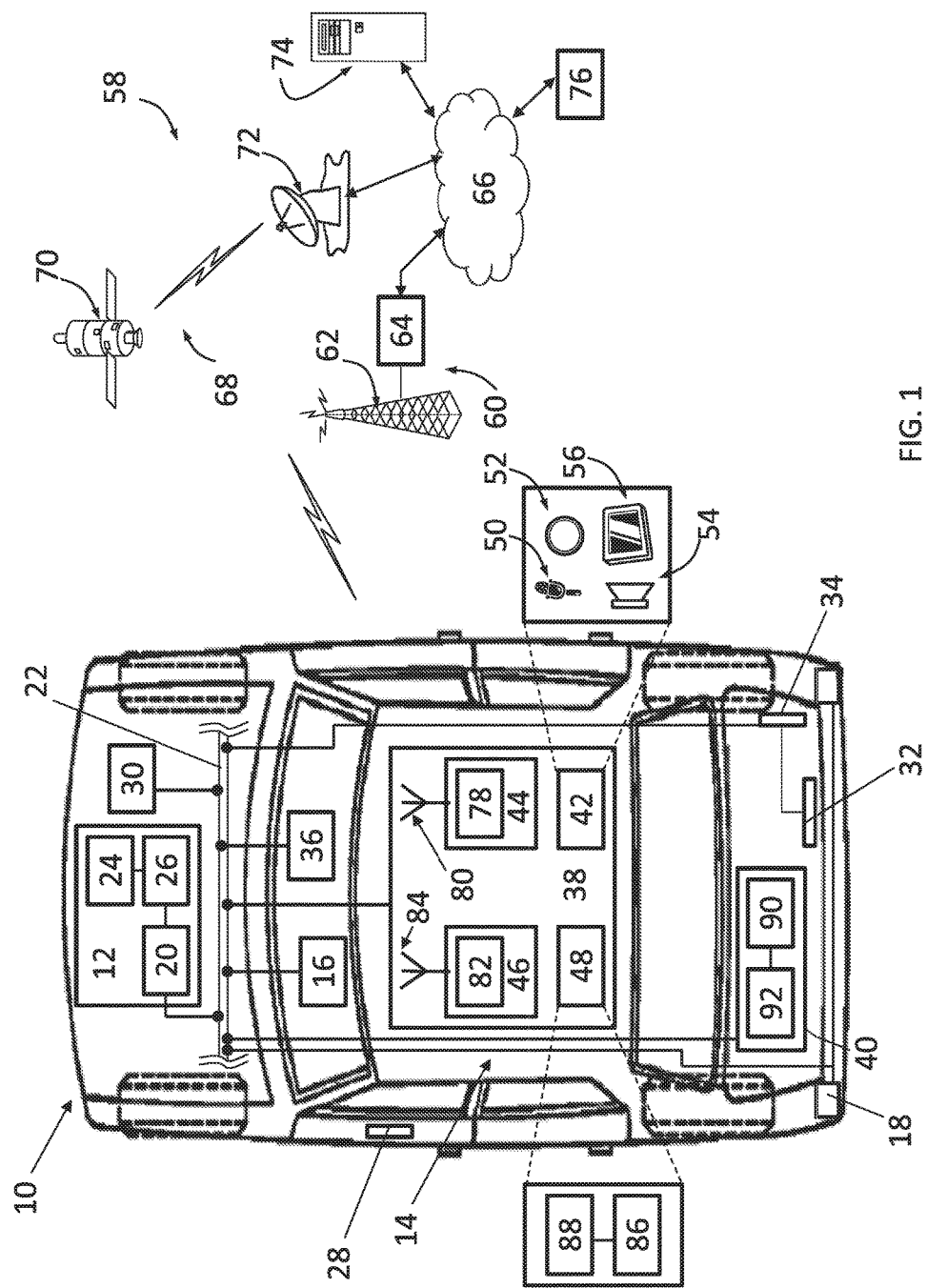
FIG. 1 is a schematic drawing illustrating a vehicle incorporating one embodiment of a vehicle access system in accordance with the present teachings.

Referring now to the drawings wherein like reference numerals are used to identify identical components in the various views, FIG. 1 illustrates a vehicle 10 incorporating one embodiment of a vehicle access system in accordance with the present teachings. Vehicle 10 is depicted in the illustrated embodiment as a passenger car, but it should be appreciated that the vehicle access system disclosed herein could be used or implemented in a wide variety of vehicles including trucks, sports utility vehicles (SUVs), recreational vehicles (RVs), etc. Vehicle 10 may include a variety of vehicle subsystems including, but not limited to, subsystems used to control vehicle 10 such as body control module 12 and subsystems used to provide services to occupants of vehicle 10 such as a navigation system (not shown) or infotainment system (not shown). In accordance with the present teachings, vehicle 10 may further include a vehicle access system 14 that enables a user of vehicle 10 to obtain entry to vehicle 10 or use device charging ports of vehicle 10 even when the user is unable to use passive entry passive start systems that may be included in vehicle 10.

Body control module 12 controls various electronic devices and systems within vehicle 10. Body control module 12 may control, for example, power locks for doors and rear closures, power windows, windshield wipers, remote start systems, and cruise control systems, and an information display panel among other devices and systems. In accordance with one aspect of the present teachings, body control module 12 may control various devices and systems such as an interior chime, a door lock motor, a mirror motor, a turn indicator, an alarm status indicator, a parking lamp, or a dome lamp, or even a horn 16 or exterior lights 18 (e.g. daytime turn lamps), which can be used to produce audible, visual, or tactile feedback to individuals outside of vehicle 10 during use of system 14 as discussed in greater detail hereinbelow. Body control module 12 may include an input/output interface 20 configured to receive input signals from individual sensors and other control modules and generate output signals for use in controlling various devices and systems within vehicle 10. Interface 20 may receive and transmit signals over dedicated conductors or over a general-purpose vehicle communications bus 22. Body control module 12 may further include an electronic memory device 24 that stores input data, look up tables and other data structures, and software programs and an electronic processing device 26 (e.g., a microprocessor, a microcontroller, an application specific integrated circuit (ASIC), etc.) that executes instructions for software, firmware, programs, algorithms, scripts, etc. that are stored in memory device 24. Although a body control module 12 is described herein for use in controlling various devices and systems such as an interior chime, a horn, a door lock motor, a mirror motor, a turn indicator, an alarm status indicator, a parking lamp, or a dome lamp for a specified purpose, it should be understood that these systems may have their own independent control modules that respond to specific inputs and generate specific outputs.

Vehicle access system 14 allows a user of vehicle 10 to obtain entry to vehicle 10 and use a device charging system of vehicle 10 even when the user is unable to use passive entry passive start systems that may be included in vehicle 10. System 14 may include one or more vehicle subsystems that are configured to control access to an interior compartment of vehicle 10 or providing electrical power to a device charging port of vehicle 10 such as a lock system 28 power distribution system. System 14 further includes an actuator 32 and a corresponding switch 34 indicative of the state of the actuator 32. In some embodiments, system 14 may further include a display 36, which may be embodied as a driver's information center (DIC), for communicating information to a user of vehicle 10 and/or a telematics unit 38. Finally, system 14 includes a controller 40.

Lock system 28 is provided to control access to an interior compartment of vehicle 10 such as the cabin of vehicle 10 or a storage compartment of vehicle 10 (e.g., a trunk). System 28 may include a lock that is provided to maintain a door or a rear closure (e.g., a trunk lid or liftgate) in a closed position preventing ingress to or egress from interior compartments of vehicle 10. The lock is capable of assuming a locked state and an unlocked state. The lock may be in the form of a latch that engages a striker when the door or rear closure is closed. The latch may be disengaged from, and reengaged with, the striker using a variety of mechanical and electro-mechanical means such as external and internal door handles and motor-driven actuators that control movement of the latch to engage and disengage the striker in order to move the lock between the locked and unlocked states. A typical actuator may include a rod that engages the latch and a motor configured to control movement of the rod responsive to signals from one or more controllers including controllers acting in response to signals from a power door lock interface or from key fobs, smartphones or other mobile communications devices. In accordance with one aspect of the present teachings, the motor may also control movement of the rod responsive to signals from controller 40 of system 14 as discussed in greater detail below.

Power distribution system 30 is directly connected to the battery of vehicle 10, and is used to provide electrical energy to the various subsystems of vehicle 10 that require electrical energy. During the use of system 14 as described herein, power distribution system 30 may be commanded (i.e., by controller 40) to provide electrical energy to any device charging ports of vehicle 10, such as USB ports, such that one the user gains access to the vehicle (i.e., on the basis of actuating lock system 28), the user will have the ability to charge an electrical device, possibly associated with the vehicle PEPS system.

Actuator 32 and switch 34 are used by an individual to submit an access code in order to gain entry to vehicle 10. In accordance with one aspect of the present teachings, actuator 32 may comprise an existing component of vehicle 10 that is used for another purpose. For example, actuator 32 may comprise a door handle switch, an exterior rear closure switch, a trunk pad, or a keypad that is accessible from an exterior of vehicle 10 for use in requesting entry to vehicle 10. Actuator 32 is movable between first and second positions. Switch 34 is coupled to actuator 32 and assumes one state when actuator 32 is in a first position and a second state when actuator is in the second position. Switch 34 may, for example, comprise a pushbutton switch that switches states responsive to the position of actuator 32.

Display 36 is provided for use in displaying information to a user of vehicle 10 for use in certain embodiments of system 14. For example, during the vehicle access (code entry) process, display 36, which may be embodied as the vehicle's driver information center, may be used to assist in code entry by indicating the place of the current digit being entered and the value of the current digit being entered. Previously-entered digits may be concealed for security purposes. Display 36 may comprise a liquid crystal display or light emitting diode display and may comprise a touch screen display. Display 36 is disposed within the vehicle cabin and may be located in a center console of the vehicle or in an instrument panel. Display 36 may also form part of a vehicle infotainment system, navigation system or collision avoidance system or may form a part of telematics unit 38.

As initially noted above, the vehicle access system 14 may be integrated with other vehicle systems, such as the vehicle's embedded controller or an accessory device connected to an in-vehicle communication network, which will now be described. Telematics unit 38 may comprise an OEM-installed (embedded) or aftermarket telematics unit that is installed in the vehicle 10 and that enables wireless voice and/or data communication over a wireless carrier system and via wireless networking. Unit 38 may enable communication between vehicle 10 and a call center, other telematics-enabled vehicles, or some other entity or device. Unit 38 can therefore be used to provide a diverse range of vehicle services that involve wireless communication to and/or from the vehicle 10. Such services include: turn-by-turn directions and other navigation-related services that are provided in conjunction with a GPS-based vehicle navigation system; airbag deployment or collision notification and other emergency or roadside assistance-related services that are provided in response to signals received from various vehicle control modules; diagnostic reporting using information obtained from vehicle control modules or diagnostic modules; and infotainment-related services where music, webpages, movies, television programs, videogames and/or other information is downloaded by an infotainment system and is stored for current or later playback. The above-listed services are by no means an exhaustive list of all of the capabilities of telematics unit 38, but are simply an enumeration of some of the services that telematics unit 38 is capable of offering. Telematics unit 38 may include a user interface 42, a network communication module 44, a wireless communication module 46 and a controller 48.

User interface 42 enables vehicle occupants to access or initiate various services through telematics unit 38 and to provide and receive information from a call center, other telematics-enabled vehicles or other entity or device. Interface 42 may include any combination of hardware, software and/or other components that enable a vehicle occupant to exchange information or data through unit 38. The interface 42 may therefore include input components such as a microphone 50, one or more pushbuttons 52, a touch-screen display or other input device where user interface 46 receives information from a vehicle occupant, as well as output components like an audio system 54, a visual display 56, or an instrument panel, where user interface provides information to the vehicle occupant. Microphone 50 provides audio input to the telematics unit 38 to enable the driver or other occupant to provide voice commands and carry out hands-free calling. For this purpose, it can be connected to an on-board automated voice processing unit utilizing human-machine interface (HMI) technology known in the art. The pushbutton(s) 52 allow manual user input into the telematics unit 38 to initiate wireless telephone calls and provide other data, response, or control input. Separate pushbuttons 52 can be used for initiating emergency calls versus regular service assistance calls. The audio system 54 provides audio output to a vehicle occupant and can be a dedicated, stand-alone system or part of the primary vehicle audio system providing AM, FM and satellite radio, CD, DVD and other multimedia functionality. This functionality can be provided in conjunction with or independent of an infotainment system (not shown). Visual display 56 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation. Some components of the interface 42, such as microphone 50 and pushbuttons 52 may be connected directly to the telematics unit 38 whereas others are indirectly connected using one or more network connections, such as vehicle communications bus 22. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. Some or all components of user interface 42 may be mounted on the vehicle's rear view mirror.

Network communication module 44 includes a network interface configured for connection to a telecommunications network 58. Network 58 may comprise the public internet, a local area network (LAN), wide area network (WAN), virtual private network (VPN) or other form of telecommunications network. Network 58 may include a wireless carrier system such as a cellular telephone system 60 that includes a plurality of cell towers 62 or cellular base stations (only one shown), one or more mobile switching centers (MSCs) 64 and other networking components required to connect wireless carrier system with a land-based telecommunications network 66. Each cell tower 62 includes sending and receiving antennas and a base station, with the base stations from different cell towers being connected to the MSC 64 either directly or via intermediary equipment such as a base station controller. System 60 can implement any suitable communications technology, including for example, analog technologies such as AMPS, or the newer digital technologies such as CDMA (e.g., CDMA2000) or GSM/GPRS. As an alternative or in addition to cellular telephone system 60, the wireless carrier system may comprise a satellite communication system 68 that provides uni-directional or bi-directional communication with the vehicle 10. System 68 may include communication satellites 70 and an uplink transmitting station 72. Uni-directional communication can be, for example, satellite radio services, wherein programming content (news, music, etc.) is received by transmitting station 72, packaged for upload, and then sent to the satellite 70, which broadcasts the programming to subscribers. Bi-directional communication can be, for example, satellite telephony services using satellite 70 to relay telephone communications between the vehicle 10 and station 72.

Using the wireless carrier network, telematics unit 44 may be connected to network 66 and, through network 66, to various computing devices 74 and/or to a call center 76. Network 66 may be a conventional land-based telecommunications network that is connected to one or more landline telephones and connects the wireless carrier system to computing devices 74 and call center 76. For example, network 66 may include a public switched telephone network (PSTN) such as that used to provide hardwired telephony, packet- switched data communications, and the Internet infrastructure. One or more segments of network 66 could be implemented through the use of a standard wired network, a fiber or other optical network, a cable network, power lines, other wireless networks such as wireless local area networks (WLANs), or networks providing broadband wireless access (BWA), or any combination thereof. Computing devices 74 can be used for various purposes and may comprise, for example, service center computers where diagnostic information and other vehicle data can be uploaded from the vehicle via the telematics unit 38, client computers used by the vehicle owner or other subscriber for such purposes as accessing or receiving vehicle data or to setting up or configuring subscriber preferences or controlling vehicle functions, file servers to or from which vehicle data or other information is provided, web servers, or network address servers. Call center 76 may provide vehicle 10 with a number of different system back-end functions including connections to human advisors, an automated voice response system, databases, servers and the like used in providing, for example, emergency or roadside assistance services and vehicle diagnostic services.

According to one embodiment, network communication module 44 is used for cellular communication according to either GSM, CDMA, or LTE standards and therefore includes a standard cellular chipset for voice communications like hands-free calling, a wireless modem (not shown) for data transmission, and a radio transceiver 78 that transmits signals to and receives signals from a dual antenna 80 for wireless communication with network 58. It should be appreciated that the wireless modem can either be implemented through software that is stored in a memory in the telematics unit 38 and is executed by controller 42, or it can be a separate hardware component located internal or external to telematics unit 38. The modem can operate using any number of different standards or protocols such as LTE, EVDO, CDMA, GPRS, and EDGE. Transceiver 78 may communicate with cell towers 62 through antenna 80 using communication topologies including frequency, time and code division multiple access topologies (i.e. FDMA, TDMA, CDMA). Unit 38 establishes a communications channel (a voice channel and/or a data channel) with the wireless carrier system so that voice and/or data transmissions can be sent and received over the channel. Data can be sent either via a data connection, such as via packet data transmission over a data channel, or via a voice channel using techniques known in the art. For combined services that involve both voice communication (e.g., with a live advisor or voice response unit at the call center 76) and data communication (e.g., to provide GPS location data or vehicle diagnostic data to the call center 76), the unit 38 can utilize a single call over a voice channel and switch as needed between voice and data transmission over the voice channel, and this can be done using techniques known to those skilled in the art. When used for packet-switched data communication such as TCP/IP, telematics unit 38 can be configured with a static IP address or can set up to automatically receive an assigned IP address from another device on the network such as a router or from a network address server.

Wireless communication module 46 is configured for short range wireless communication with short range wireless communication devices used in or near vehicle 10 including embedded vehicle systems and mobile communication devices carried by users of vehicle 10 such as key fobs, cellular phones (including smart phones) and portable computing devices that are not mechanically connected to vehicle 10 and are configured for wireless communication with module 46. Module 46 may communicate signals from short range wireless mobile communication devices to various vehicle systems (e.g., door locks or remote starting systems) for use in controlling those systems from the mobile communications devices. Module 46 also permits embedded vehicle systems and mobile communications devices to access telecommunications network 58 via network communication module 44. In this manner, telematics unit 38 may function as a wireless access point within vehicle 10 (i.e. a hotspot) for certain vehicle systems and mobile communications devices to access network 58. Module 46 may include any combination of hardware, software and/or other components that enable wireless voice and/or data communication between module 46 and short range wireless communication devices and, in particular, may include a wireless interface configured for short range wireless communication with such devices. Module 46 may include a radio transceiver 82 configured for short range wireless communication with mobile communications devices over an antenna 84 using short-range wireless technologies such as Wi-Fi (IEEE 802.11), WiMAX, Wi-Fi direct, Bluetooth, Zigbee, near field communication (NFC), etc.

Controller 48 is provided to control and manage communications among interfaces 44, 46, vehicle communications bus 22 and potentially dedicated hardwired connections within vehicle 10. Controller 48 may include a variety of electronic processing devices, memory devices, input/output (I/O) devices, and/or other known components, and may perform various control and/or communication related functions. In an exemplary embodiment, controller 48 includes an electronic memory device 86 that stores various look up tables or other data structures and software programs, etc. Controller 48 may also include an electronic processing device 88 (e.g., a microprocessor, a microcontroller, an application specific integrated circuit (ASIC), etc.) that executes instructions for software, firmware, programs, algorithms, scripts, etc. that are stored in memory device 86. Controller 48 may be a dedicated controller used only for telematics unit 38 or can be shared with other vehicle systems. Controller 48 may be electronically connected to other vehicle devices, modules and systems via vehicle communications bus 22 or other communication means and can interact with them when required.

The controller 40 for system 14 is provided to control one or more vehicle subsystems 28, 30 in response to movement of actuator 32 in order to permit entry to vehicle 10 and/or provide electrical power to one or more device charging ports of vehicle 10. Controller 40 may include a variety of electronic processing devices, memory devices, input/output (I/O) devices, and/or other known components, and may perform various control and/or communication related functions. In an exemplary embodiment, controller 40 includes an electronic memory device 90 that stores various look up tables or other data structures and software programs, etc. In accordance with one aspect of the present teachings, memory device 90 may store one or more authorization codes. Controller 40 may also include an electronic processing device 92 (e.g., a microprocessor, a microcontroller, an application specific integrated circuit (ASIC), etc.) that executes instructions for software, firmware, programs, algorithms, scripts, etc. that are stored in memory device 90. Controller 40 may be a dedicated controller used only for system 14 or can be shared with other vehicle systems. Controller 40 may be electronically connected to other vehicle devices, modules and systems via vehicle communications bus 22 or other communication means and can interact with them when required.

Telematics unit 38 and network communication module 44, for example, may be used when the user of vehicle 10 desires initially to create a PIN code for use with vehicle access system 14. As initially noted above, the authorization code may be provided to the vehicle using a vehicle reservation system or a remote link application. Vehicle reservation systems are widely used in car-sharing programs. The user of a car sharing program initially creates a reservation to reserve access to a shared car. This may be done electronically through the website of the car sharing service or using a mobile application. The user is then issued an electronic reservation certificate that confirms the user's reservation of the shared car. During the reservation process, the user may generate a PIN code for use in connection with system 14. This may be communicated electronically to the shared car, for example using telematics unit 38 and network communication module 44. In this manner, a virtual key reservation system and application may be used for the user to create and convey a PIN code for use in connection with vehicle access system 14. In another embodiment, the PEPS system includes a mobile application, resident on the user's mobile device, which is used to operate the various features of the PEPS system. This mobile application may be configured to include a PIN code entry means for the user to initially supply a PIN code to the vehicle for use with system 14. Again, this may be communicated electronically to the shared car, for example using telematics unit 38 and network communication module 44.

In accordance with one embodiment of the present teachings, controller 40 may be configured with appropriate programming instructions or code (i.e., software) to perform several steps in a method for accessing of vehicle 10, and for activating charging ports of vehicle 10. The code may be stored in memory device 90 of controller 40 and may be uploaded to memory device 90 from a conventional computer storage medium.

Figure 2:
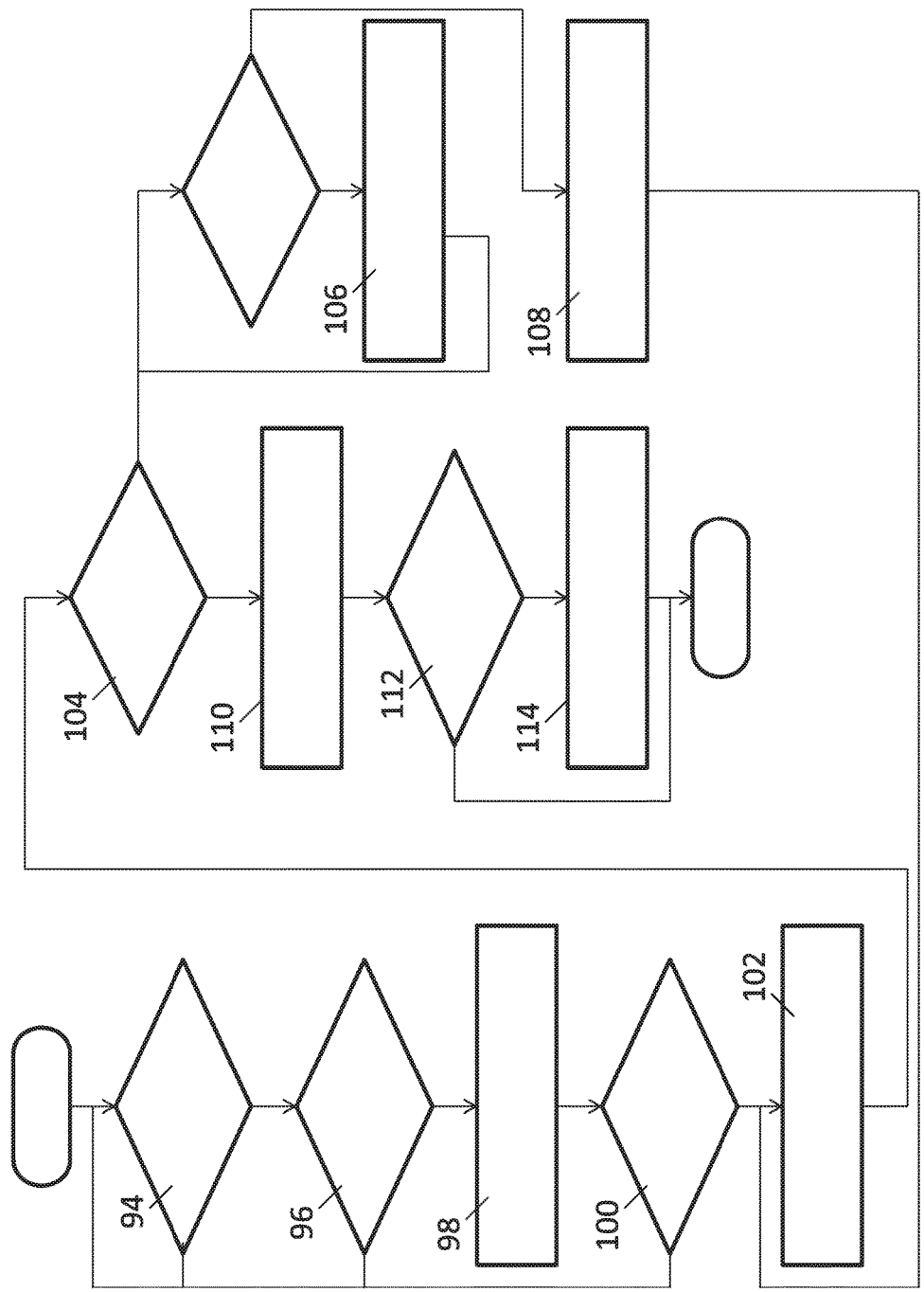
FIG. 2 is a flowchart diagram illustrating one embodiment of a method for accessing a vehicle in accordance with the present teachings.

Referring now to FIG. 2, one embodiment of the method may begin with the step 94 of detecting an initial actuation sequence of the actuator 32 used to signal the controller 40 that the user will subsequently be entering an access code to request entry to vehicle 10. The initial actuation sequence may comprise, for example, a series of rapid actuations of actuator 32 in a short period of time or a single actuation of actuator 32 that is maintained for a relative long period of time. It should be understood, however, that various initial actuation sequences could be employed. In step 96, controller 40 may compare the initial actuation sequence to a predetermined actuation sequence. If the initial actuation sequence does not meet a predetermined condition relative to the predetermined actuation sequence (e.g., the initial actuation sequence is not the same as the predetermined actuation sequence), controller 40 may return to step 94 and await entry of an initial actuation sequence that meets the predetermined condition. If the initial actuation sequence meets the predetermined condition relative to the predetermined actuation sequence (e.g., the initial actuation sequence is the same as the predetermined actuation sequence), the method may proceed with the step 98 of monitoring switch 34 for receipt of an access actuation sequence entered using actuator 32 and corresponding to the access code. The controller 40 may be configured to monitor switch 34 for the access actuation sequence for only a predetermined period of time. Therefore, in step 100, controller may terminate monitoring of switch 34 for the access actuation sequence if the actuator 32 is not moved between positions before a predetermined amount of time has passed following receipt of the initial actuation sequence.

Assuming that the user begins to move actuator 32 before the predetermined amount of time has passed, the method may continue with the step 102 of detecting an access actuation sequence of actuator 32. The access actuation sequence comprises a specific manner of actuating actuator 32 that corresponds to, and represents, an access code. In accordance with one embodiment, the access code may comprise a plurality of digits and the access actuation sequence may comprise a number of movements of actuator 32 from one position to another position equal to each of the plurality of digits with the absence of movement of actuator 32 for a period of time corresponding to a transition between successive digits of the plurality of digits in the access code. For example, if the access code comprises 123, a user may move the actuator 32 from a first position to a second position one time, return the actuator 32 to the first position and pause, move the actuator 32 from the first position to the second position two times in a relatively short period of time, return the actuator 32 to the first position and pause, and then move the actuator 32 from the first position to the second position three times in a relatively short period of time. It should be understood, of course, that the time period between successive movements of actuator 32 when attempting to convey a digit should be less than the time period used to convey a transition between digits. Controller 40 may be configured to compare the times between movements of actuator 32 to predetermined thresholds in order to assess whether the user is entering a digit or is transitioning between digits. Alternatively, controller 40 may be configured to monitor the times between all of the movements of actuator 32 and then identify which movements correspond to digits and which movements correspond to transitions between digits based on differences in those times (e.g. by correlating the longest time periods to transitions between digits) so that system 14 is adaptable to different users. In accordance with another embodiment, the access code again comprises a plurality of digits and the access actuation sequence comprises periods of time during which the actuator 32 is in a first position and periods of time during which the actuator 32 is a second position. The periods of time during which the actuator 32 is in the first position correspond to one of the plurality of digits while the periods of time during which the actuator 32 is the second position correspond to a transition between successive digits in the plurality of digits. For example, if the access code comprises 123, a user may move the actuator 32 to the first position for one second, move the actuator 32 to the second position, move the actuator 32 back to the first position for two seconds, move the actuator 32 to the second position, and then move the actuator 32 to the first position for three seconds before returning the actuator 32 to the second position. It should be understood, however, that the time periods stated herein are exemplary and different time periods can be used as long as a functional relationship exists between the time periods and the digits used in the access code. In alternative embodiments, initially creating the PIN code may be accomplished using this same method of code entry while the vehicle is in an "authorized state" (e.g., two or more authorizing devices are present (phones or keys) and the vehicle is on, and the doors are already unlocked).

As initially noted above, in order to assist the user in entering the access code as described above, during the vehicle access (code entry) process, the vehicle's driver information center (more generally display 36) may be used to assist in code entry by indicating the place of the current digit being entered and the value of the current digit being entered. The user will be able to see this display through a vehicle window. Thus, the user can visually confirm as each digit in the code is entered into system 14. Previously-entered digits may be obscured, after entry, for privacy and security. Moreover, the vehicle may provide audible, visual, or tactile feedback to the user during the vehicle access (code entry) process, using for example an interior chime, a horn, a door lock motor, a mirror motor, a turn indicator, an alarm status indicator, a parking lamp, or a dome lamp. This can further serve as confirmation to the user that a particular digit has been entered and accepted by the system 14.

Once the access actuation sequence is detected and the access code identified, the method may continue with the step 104 of comparing the access code to an authorization code. The authorization code is the predetermined code permitting entry to vehicle 10 by a user. As described above, the authorization code may have been previously supplied to the vehicle by the user, for example using a vehicle reservation system or a remote link application. The authorization code may be stored in memory device 90 of controller 40. If the access code entered by the user does not correspond to the authorization code (e.g., is not the same as the authorization code), controller 40 may be configured to perform the step 106 of ignoring any subsequent actuation sequence until a predetermined period of time has passed following entry of the access actuation sequence. The delay in time can be useful in preventing attempts at unauthorized use of vehicle 10 and in identifying the start and end of actuation sequences. Further, controller 40 may be configured to increase the predetermined period of time that the user must wait to attempt to enter a new access actuation sequence each time that the entered access actuation sequence does not correspond to the authorization code to discourage repeated attempts by unauthorized users. Controller 40 may be further configured to perform the step 108 of generating a control signal after the predetermined period of time has passed to cause vehicle 10 to alert the user that the user can reattempt entry of vehicle 10.

If the access code entered by the user does correspond to the authorization code (e.g., the access code is the same as the authorization code), controller 40 may be configured to perform the step 110 of generating a control signal to cause a vehicle subsystem to change states. In the case of lock system 28, the control signal may be configured to cause a lock to switch from a locked state to an unlocked state (e.g., by activating a motor driving an actuator that controls a latch). In the case of power distribution system 30, the control signal may be configured to cause electrical power to be supplied to one or more device charging ports. Controller 40 may be further configured in step 112 to determine whether a user has entered vehicle 10 after the vehicle 10 has been unlocked and in step 114 to return the vehicle subsystem to its prior state or a default state if the controller 40 does not detect the presence of the user with a predetermined period of time. In other words, if the user does not enter vehicle 10 after requesting entry to vehicle 10, controller 40 may be configured to generate control signals that cause the lock of lock system 28 to return to a locked state and/or the power distribution system 30 to return to an inactive state. Controller 40 may determine whether a user has entered vehicle 10 in various ways including, but not limited to, signals from switches and sensors that indicate that a vehicle door is ajar, that a weight is present on a vehicle seat, that an infotainment system is active, or that a temperature change has occurred in the vehicle cabin.

While at least one exemplary vehicle access embodiment has been presented in the foregoing detailed description, it should be appreciated that a vast number of variations exist. It should also be appreciated that the exemplary vehicle access embodiment or exemplary vehicle access embodiments are only examples, and are not intended to limit the scope, applicability, or configuration of the disclosure in any way. Rather, the foregoing detailed description will provide those skilled in the art with a convenient road map for implementing an exemplary vehicle access embodiment of the disclosure. It is understood that various changes may be made in the function and arrangement of elements described in an exemplary vehicle access embodiment without departing from the scope of the disclosure as set forth in the appended claims.

What is claimed is:
1. An access system for a vehicle, comprising:
a first vehicle subsystem configured to control access to an interior compartment of the vehicle;
an actuator mounted on the vehicle and movable between first and second positions; and
a controller coupled to the actuator and configured to:
detect a first actuation sequence of the actuator, the first actuation sequence corresponding to an access code;
during the first actuation sequence of the actuator, provide an audible, visual, or tactile response from the vehicle, by causing activation of a vehicle system that is optionally selected from one or more of an interior chime, a horn, a door lock motor, a mirror motor, a turn indicator, an alarm status indicator, a parking lamp, and a dome lamp;
compare the access code to an authorization code;
generate a first control signal configured to cause the first vehicle subsystem to switch between a first state and a second state when the access code corresponds to the authorization code;
the access system further comprising a display system that is positioned inside of the vehicle but visible from outside of the vehicle, wherein the display system displays at least a portion of the access code during the first actuation sequence; and wherein the first vehicle subsystem is a door lock subsystem, wherein the first state is a locked vehicle state, and wherein the second state is an unlocked vehicle state.

2. The access system of claim 1, wherein the display system displays an access code placeholder and an access code digit value.

3. The access system of claim 2, wherein the display system obscures entered digits of the access code prior to the placeholder.

4. The access system of claim 1, wherein the access system is electronically coupled with an in-vehicle communication network.

5. The access system of claim 4, wherein the in-vehicle communication network is configured to receive the authorization code via a wireless electronic signal.

6. The access system of claim 5, wherein the wireless electronic signal originates from a virtual reservation system.

7. The access system of claim 5, wherein the wireless electronic signal originates from an electronic application associated with a passive entry passive start (PEPS) or telematics system of the vehicle.

8. The access system of claim 1, wherein the actuator is positioned on a door handle of the vehicle.

9. The access system of claim 1, wherein the actuator is positioned on an exterior rear closure control of the vehicle.

10. The access system of claim 1, wherein the first vehicle subsystem is an electrical subsystem for a device charging port, wherein the first state is electrical energy not being supplied to the device charging port, and wherein the second state is electrical energy being supplied to the device charging port.

11. A method for accessing a vehicle, comprising:
using an actuator mounted on the vehicle and movable between first and second positions, detecting a first actuation sequence of the actuator, the first actuation sequence corresponding to an access code;
using a controller, during the first actuation sequence of the actuator, providing an audible, visual, or tactile response from the vehicle, by causing activation of a vehicle system that is optionally selected from one or more of an interior chime, a horn, a door lock motor, a mirror motor, a turn indicator, an alarm status indicator, a parking lamp, and a dome lamp;
using the controller, comparing the access code to an authorization code;
using a first vehicle subsystem configured to control access to an interior compartment of the vehicle, generating a first control signal configured to cause the first vehicle subsystem to switch between a first state and a second state when the access code corresponds to the authorization code;
the method further comprising, using a display system that is positioned inside of the vehicle but visible from outside of the vehicle, displaying at least a portion of the access code during the first actuation sequence; and
wherein the first vehicle subsystem is a door lock subsystem, wherein the first state is a locked vehicle state, and wherein the second state is an unlocked vehicle state.

12. The method of claim 11, further comprising, using the display system, displaying an access code placeholder and an access code digit value and obscuring entered digits of the access code prior to the placeholder.

13. The method of claim 11, further comprising, using an in-vehicle communication network, receive the authorization code via a wireless electronic signal, wherein the wireless electronic signal originates from a virtual reservation system or from an electronic application associated with a passive entry passive start (PEPS) system of the vehicle.

14. The method of claim 11, wherein detecting the first actuation sequence comprises using an actuator that is positioned on a door handle of the vehicle or an actuator that is positioned on an exterior rear closure control of the vehicle.

15. The method of claim 11, wherein the first vehicle subsystem is an electrical subsystem for a device charging port, wherein the first state is electrical energy not being supplied to the device charging port, and wherein the second state is electrical energy being supplied to the device charging port.

16. The method of claim 11, wherein the method steps are performed while the vehicle is in an authorized state for purposes of initially providing the authorization code.

* * * * *